United States Patent Office 3,275,652
Patented Sept. 27, 1966

3,275,652
NOVEL 2-CARBOXAMIDO-N-IMIDOMETHYL-6-DEMETHYL-6-DEOXYTETRACYCLINES
Michael Joseph Martell, Jr., 62 Amory Ave., Pearl River, N.Y., and Andrew Stephen Tomcufcik, 48 Dearborn Drive, Old Tappan, N.J.
No Drawing. Filed Feb. 26, 1965, Ser. No. 435,713
11 Claims. (Cl. 260—326)

This invention relates to new organic compounds and, more particularly, is concerned with novel 2-carboxamido-N-amidomethyl- and 2-carboxamido-N-imidomethyl-6-deoxytetracyclines which may be represented by the following general formula:

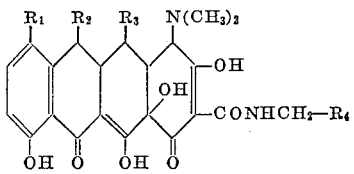

wherein $R_1$ is hydrogen or halogen; $R_2$ is hydrogen or methyl; $R_3$ is hydrogen or hydroxy; and $R_4$ is selected from the group consisting of

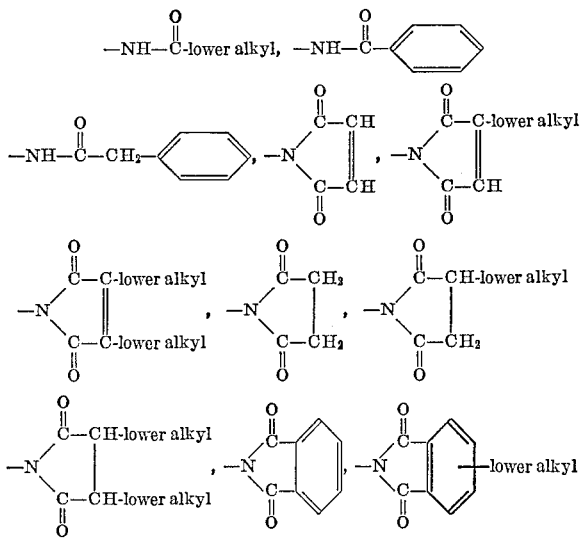

or

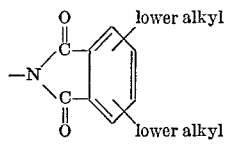

with the proviso that when $R_3$ is hydroxy then $R_2$ must be methyl. Suitable lower alkyl groups contemplated by the present invention are those having up to about 4 carbon atoms. Halogen is exemplified by chlorine and bromine.

The novel compounds of the present invention are, in general, yellow crystalline solids, somewhat soluble in organic solvents such as lower alkanols, ethyl acetate, lower alkoxy alkanols, and the like; but relatively insoluble in non-polar solvents such as ether, cyclohexane, petroleum ether, and the like.

The organic bases of this invention from non-toxic acid-addition salts with a variety of organic and inorganic salt-forming agents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic and the like. For purposes of this invention, the free bases are equivalent to their non-toxic acid-addition salts.

Among the compounds within the scope of the present invention are the following:
2-carboxamido-N-acetamidomethyl-6-deoxytetracycline,
2-carboxamido-N-acetamidomethyl-5-hydroxy-6-deoxytetracycline,
2-carboxamido-N-acetamidomethyl-7-chloro-6-demethyl-6-deoxytetracycline,
2-carboxamido-N-benzamidomethyl-7-bromo-6-deoxytetracycline,
2-carboxamido-N-benzamidomethyl-5-hydroxy-6-deoxytetracycline,
2-carboxamido-N-benzamidomethyl-6-demethyl-6-deoxytetracycline,
2-carboxamido-N-phenylacetamidomethyl-6-deoxytetracycline,
2-carboxamido-N-phenylacetamidomethyl-5-hydroxy-6-deoxytetracycline,
2-carboxamido-N-phenylacetamidomethyl-7-chloro-6-demethyl-6-deoxytetracycline,
2-carboxamido-N-maleimidomethyl-6-deoxytetracycline,
2-carboxamido-N-maleimidomethyl-5-hydroxy-6-deoxytetracycline,
2-carboxamido-N-maleimidomethyl-6-demethyl-6-deoxytetracycline,
2-carboxamido-N-(2-methylmaleimidomethyl)-6-deoxytetracycline,
2-carboxamido-N-(2-methylmaleimidomethyl)-5-hydroxy-6-deoxytetracycline,
2-carboxamido-N-(2-methylmaleimidomethyl)-6-demethyl-6-deoxytetracycline,
2-carboxamido-N-(2,3-dimethylmaleimidomethyl)-6-deoxytetracycline,
2-carboxamido-N-(2,3-dimethylmaleimidomethyl)-5-hydroxy-6-deoxytetracycline,
2-carboxamido-N-(2,3-dimethylmaleimidomethyl)-6-demethyl-6-deoxytetracycline,
2-carboxamido-N-succinimidomethyl-7-bromo-6-deoxytetracycline,
2-carboxamido-N-succinimidomethyl-5-hydroxy-6-deoxytetracycline,
2-carboxamido-N-succinimidomethyl-6-demethyl-6-deoxytetracycline
2-carboxamido-N-(2-methylsuccinimidomethyl)-6-deoxytetracycline,
2-carboxamido-N-(2-methylsuccinimidomethyl)-5-hydroxy-6-deoxytetracycline,
2-carboxamido-N-(2-methylsuccinimidomethyl)-6-demethyl-6-deoxytetracycline,
2-carboxamido-N-(2,3-dimethylsuccinimidomethyl)-6-deoxytetracycline,
2-carboxamido-N-(2,3-dimethylsuccinimidomethyl)-5-hydroxy-6-deoxytetracycline,
2-carboxamido-N-(2,3-dimethylsuccinimidomethyl)-6-demethyl-6-deoxytetracycline,
2-carboxamido-N-phthalimidomethyl-6-deoxytetracycline,
2-carboxamido-N-phthalimidomethyl-5-hydroxy-6-deoxytetracycline,
2-carboxamido-N-phthalimidomethyl-6-demethyl-6-deoxytetracycline,
2-carboxamido-N-(4-methylphthalimidomethyl)-6-deoxytetracycline, 2-carboxamido-N-(4-methylphthalimidomethyl)-5-hydroxy-6-deoxytetracycline,
2-carboxamido-N-(4-methylphthalimidomethyl)-7-chloro-6-demethyl-6-deoxytetracycline,
2-carboxamido-N-(4,5-dimethylphthalimidomethyl)-7-bromo-6-deoxytetracycline,
2-carboxamido-N-(4,5-dimethylphthalimidomethyl)-5-hydroxy-6-deoxytetracycline, and
2-carboxamido-N-(4,5-dimethylphthalimidomethyl)-6-demethyl-6-deoxytetracycline.

The novel compounds of the present invention are biologically active and have been found to possess antibacterial and antifungal activity. The half maximal inhibition concentrations, expressed in micrograms per milliliter, for some typical compounds of the present invention against *Staphylococcus aureus* ATCC 6538P when measured by a standard turbidimetric procedure (Grove, D. C., and Randall, W. A., in Assay Methods of Antibiotics, Medical Encyclopedia, Inc., New York, 1955, pp. 48–50) are set forth in the following table.

Table I

| Compound: | Concentrations effecting half-maximal inhibition |
|---|---|
| 2 - carboxamido - N - phthalimidomethyl-6 - demethyl - 6 - deoxytetracycline | 0.238 |
| 2 - carboxamido - N - maleimidomethyl-6-demethyl - 6 - deoxytetracycline | 0.138 |
| Tetracycline | 0.0165 |

The antibacterial activity of the novel compounds of the present invention makes them useful as additives to materials which are subject to microbial deterioration such as cutting oils, jet fuels and diesel oils. They are also useful in soaps, shampoos and topical compositions for the treatment of wounds and burns. The antifungal activity of the novel compounds of the present invention makes them useful as fungus inhibitors in leather tanning.

The novel compounds of the present invention may be readily prepared by the interaction of an appropriate 2-decarboximido-2-cyano-6-deoxytetracycline and an N-hydroxymethylamide or N-hydroxymethylimide as set forth in the following reaction scheme:

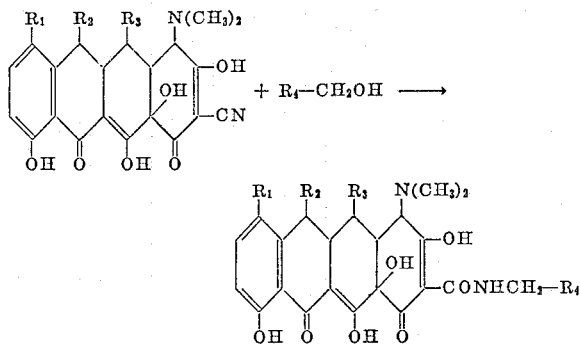

wherein $R_1$, $R_2$, $R_3$ and $R_4$ are as hereinabove defined. This condensation is carried out in concentrated strong acid such as sulfuric acid, methanesulfonic acid, benzenesulfonic acid, or the like. The reaction may also be carried out in anhydrous liquid hydrogen fluoride. The condensation is ordinarily carried out within a temperature range of about 0° C. to about 50° C. over a period of time ranging from about 10 minutes to 2 hours or so. Ordinarily in this condensation one uses an equivalent of N-hydroxymethylimide or amide.

The invention will be described in greater detail in conjunction with the following specific examples.

*Example 1.*—Preparation of 2-carboxamido-N-phthalimidomethyl-6-demethyl-6-deoxytetracycline 2 - decarboxamido - 2 - cyano-6-demethyl-6-deoxytetracycline (400 mg., 1.0 mmole) was dissolved in 6 ml. concentrated sulfuric acid. N-hydroxymethylphthalimide (196 mg., 1.1 mmole) was added. The solution was stirred at room temperature for 25 minutes and then poured slowly into 200 ml. of rapidly stirred, dry ethyl ether. The solid which precipitated was filtered off, washed with ether, and dried. The free base was prepared by slurrying the sulfate salt in 16 ml. water and adjusting the pH to a constant pH 5.0 with 2 N NaOH. The solid was filtered off, washed with water, and dried; yield, 510 mg. The crude product was purified by partition column chromatography on acid washed (neutral) Celite® using the system cyclohexane:dioxane:water=(5:5:1). The second and third hold back volumes were evaporated to give 240 mg. of product.

*Example 2.*—N-hydroxymethyl-2-methylmaleimide

A mixture of 1.11 g. (10 mmole) of 2-methylmaleimide (Brown et al., J. Chem. Soc., 1957, 2882) and 0.81 ml. of 37% formaldehyde was stirred at room temperature as the pH was adjusted to 5.0 with 5% aqueous sodium hydroxide solution. Solution occurred and the solution was stirred for 3 hours at room temperature. The water was removed in vacuo and the residue solidified upon scratching, weight 1.32 g. The material was recrystallized from a mixture of benzene and Skellysolve B (mixed hexanes), M.P. 65–66° C.

*Example 3.*—N-hydroxymethyl-2,3-dimethylmaleimide

The procedure of Example 2 is repeated, substituting an equimolecular amount of 2,3-dimethylmaleimide for the 2-methylmaleimide employed in that example. There is thus obtained the N-hydroxymethyl-2,3-dimethylmaleimide. M.P. 45° C.

*Example 4.*—Preparation of 2-carboxamido-N-maleimidomethyl-6-demethyl-6-deoxytetracycline In place of the N-hydroxymethylphthalimide of Example 1 there is employed an equimolecular quantity of N-hydroxymethylmaleimide whereby the 2-carboxamido-N-maleimidomethyl-6-demethyl-6-deoxytetracycline is obtained in equally good yield.

The partition chromatography data for typical compounds of the present invention is set forth in the following table:

Table II

| Compound | $Rf^1$ | Partition Chromatography Data |
|---|---|---|
| 2-Carboxamido-N-phthalimidomethyl-6-demethyl-6-deoxytetracycline | 0.83 | C:D:W [2] 5:5:1 HBV [3] 2.0–3.0 |
| 2-Carboxamido-N-maleimidomethyl-6-demethyl-6-deoxytetracycline | 0.69 | H:EA:M:W 40:60:17:6 |

[1] $Rf$ is for the system n-butanol-phosphate buffer pH 2.0.
[2] Solvent symbols: H=n-heptane; EA=ethylacetate; W=water; M=methanol; C=cyclohexane; D=dioxane.
[3] HBV=hold back volume (column solvent retention).

What is claimed is:
1. A compound selected from the group consisting of those of the formula:

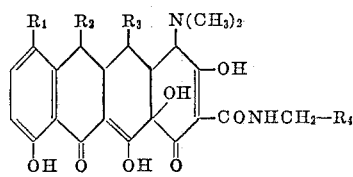

wherein $R_1$ is selected from the group consisting of hydrogen and halogen, $R_2$ is selected from the group consisting of hydrogen and methyl, $R_3$ is selected from the group consisting of hydrogen and hydroxy, and $R_4$ is selected from the group consisting of

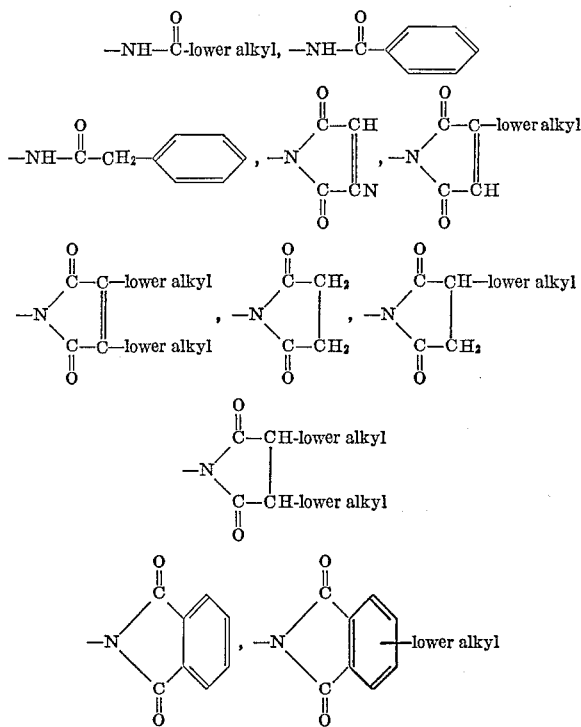

and

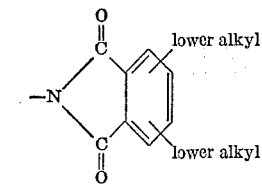

with the proviso that when $R_3$ is hydroxy then $R_2$ must be methyl; and the non-toxic acid-addition salts thereof.

2. 2 - carboxamido - N - acetamidomethyl - 6 - deoxytetracycline.
3. 2 - carboxamido - N - benzamidomethyl - 5 - hydroxy-6-deoxytetracycline.
4. 2 - carboxamido - N - phenylacetamidomethyl - 7-chloro-6-demethyl-6-deoxytetracycline.
5. 2 - carboxamido - N - maleimidomethyl - 6 - demethyl-6-deoxytetracycline.
6. 2 - carboxamido - N - (2,3 - dimethylmaleimidomethyl)-6-deoxytetracycline.
7. 2 - carboxamido - N - succinimidomethyl - 5 - hydroxy-6-deoxytetracycline.
8. 2 - carboxamido - N - (2 - methylsuccinimidomethyl)-6-demethyl-6-deoxytetracycline.
9. 2 - carboxamido - N - phthalimidomethyl - 6 - demethyl-6-deoxytetracycline.
10. 2 - carboxamido - N - (4 - methylphthalimidomethyl)-6-deoxytetracycline.
11. 2 - carboxamide - N - (4,5 - dimethylphthalimidomethyl)-7-bromo-6-deoxytetracycline.

No references cited.

ALEX MAZEL, *Primary Examiner.*

UNITED STATES PATENT OFFICE
CERTIFICATE OF CORRECTION

Patent No. 3,275,652                      September 27, 1966

Michael Joseph Martell, Jr., et al.

It is hereby certified that error appears in the above numbered patent requiring correction and that the said Letters Patent should read as corrected below.

In the heading to the printed specification, lines 4, 5 and 6, for "Michael Joseph Martell, Jr., 62 Amory Ave., Pearl River, N. Y., and Andrew Stephen Tomcufcik, 48 Dearborn Drive, Old Tappan, N. J." read -- Michael Joseph Martell, Jr., Pearl River, N. Y., and Andrew Stephen Tomcufcik, Old Tappan, N. J., assignors to American Cyanamid Company, Stamford, Conn., a corporation of Maine --; column 5, lines 8 to 11, the portion of the formula should appear as shown below instead of as in the patent:

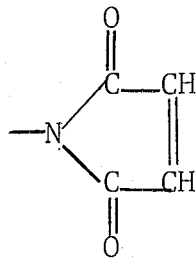

Signed and sealed this 22nd day of August 1967.

(SEAL)
Attest:

ERNEST W. SWIDER                      EDWARD J. BRENNER
Attesting Officer                    Commissioner of Patents

UNITED STATES PATENT OFFICE
CERTIFICATE OF CORRECTION

Patent No. 3,275,652　　　　　　　　　　September 27, 1966

Michael Joseph Martell, Jr., et al.

It is hereby certified that error appears in the above numbered patent requiring correction and that the said Letters Patent should read as corrected below.

In the heading to the printed specification, lines 4, 5 and 6, for "Michael Joseph Martell, Jr., 62 Amory Ave., Pearl River, N. Y., and Andrew Stephen Tomcufcik, 48 Dearborn Drive, Old Tappan, N. J." read -- Michael Joseph Martell, Jr., Pearl River, N. Y., and Andrew Stephen Tomcufcik, Old Tappan, N. J., assignors to American Cyanamid Company, Stamford, Conn., a corporation of Maine --; column 5, lines 8 to 11, the portion of the formula should appear as shown below instead of as in the patent:

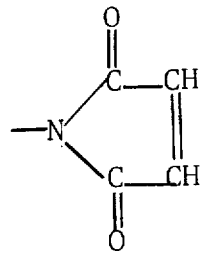

Signed and sealed this 22nd day of August 1967.

(SEAL)
Attest:

ERNEST W. SWIDER　　　　　　　　　　EDWARD J. BRENNER
Attesting Officer　　　　　　　　　　Commissioner of Patents